Jan. 1, 1957  D. SINKLER  2,776,104
LINED VALVE
Filed March 29, 1954  2 Sheets-Sheet 1

INVENTOR.
DEAS SINKLER
BY
Marechal, Biebel, French & Bugg
ATTORNEYS

Jan. 1, 1957   D. SINKLER   2,776,104
LINED VALVE

Filed March 29, 1954   2 Sheets-Sheet 2

INVENTOR.
DEAS SINKLER
BY
ATTORNEYS

United States Patent Office 2,776,104
Patented Jan. 1, 1957

2,776,104

LINED VALVE

Deas Sinkler, Dayton, Ohio, assignor to The Duriron Company, Inc., Dayton, Ohio, a corporation of New York Application March 29, 1954, Serial No. 419,530

5 Claims. (Cl. 251—192)

This invention relates to plug valves, and more particularly to lined valves of the type employed for the handling of corrosive fluids and the like.

The invention has special application to such lined valves which are required in use to operate over a considerable range of temperatures, and the primary object of the invention is to provide a lined valve which is of such structural and operational characteristics that it will operate satisfactorily over a wide temperature range without undesirable effects caused by differential thermal expansion of the component parts thereof.

This basic objective of the invention is directed to conditions which derive from the fact that in order to construct a lined valve capable of satisfactorily handling corrosive fluids, it is frequently necessary to employ different materials in the valve body, the plug and the liner. Such different materials may have correspondingly different coefficients of thermal expansion, and this is most often true of the liner materials as compared with the metals employed in the valve body and plug since many liner materials which are preferred for their desirable properties as a valve liner also have considerably greater coefficients of thermal expansion than metals of the corrosion-resistant properties needed for this type of valve. These conditions may be tolerated successfully for installations where the temperature of operation does not vary over a wide range, but they may create major difficulties where the valve is subject to substantial changes in temperature, as for example in installations where the pipe line and valve may operate normally in the room temperature range but are from time to time flushed out with steam for cleaning purposes.

The difficulties arising from the presence in a lined valve of materials having different coefficients of expansion are directly related to another complicating factor in such a valve, namely that unless the liner is placed under at least some positive compressive force radially of the plug, the proper sealing action of the liner between the plug and the surrounding surface of the bore in the valve body may not be established. If the liner material in such a valve has a substantially greater coefficient of thermal expansion than the materials forming the body and plug, and if the sealing pressure is established at a comparatively low temperature such as room temperature, then when the operating temperature increases, the pressure on the liner will increase at a rate proportional to the difference between the coefficients of thermal expansion of the liner and of the materials of the body and plug. This in itself is not necessarily undesirable if thereafter the operating temperature range remains fairly constant, but it may create major difficulties in the event of fluctuations in temperature below the established maximum.

To explain this latter point in more detail, liner materials which are otherwise highly satisfactory for use in lined valves appear also to be characterized by a tendency to failure by rupture, permanent deformation or the like if they are stressed beyond a maximum tolerable limit. Consider, for example, the case stated above in which the sealing pressure conditions are initially established in a lined valve at room temperature and the valve is subsequently heated materially above this initial temperature and then again cooled. If the increased pressure on the liner developed at the high temperature as the result of the greater expansion of the liner is in excess of its elastic limit, permanent deformation (cold flow) of the liner will take place such that when the valve closes, the liner may no longer fill the space between the plug and the bore in the valve body with sufficient pressure to maintain the seal. As a result, a lined valve which is initially entirely satisfactory at its normal operating temperatures may after steam cleaning of the line suffer such reduction in sealing pressure therein at its normal temperature range as to cause leakage through the valve and perhaps also to the outside, which is highly undesirable especially where corrosive fluids are concerned.

It should also be noted that the wall thickness of the liner is a factor having a direct relationship with the conditions of use of the valve, and particularly with the intended temperature range to which the valve will be subjected in use. More specifically, since the total thermal expansion of a body is a function of its actual dimensions at a given temperature, the total expansion of the liner over a given temperature range will depend upon its actual wall thickness. Therefore, for such given temperature range, there is a preferred initial wall section for the liner, and such preferred section decreases with increase in the temperature range. The same relationships also apply for the plug and the valve body, and thus the initial proportioning of all these parts is of definite importance.

The present invention has among its major objectives the provision of a lined valve wherein the valve body and plug and the liner are of such materials and related proportions that the valve as a whole is essentially self-compensating for changes in temperature and maintains adequate sealing pressure over the entire temperature range effective thereon in use.

Understanding of the invention and conditions with which it is concerned may be facilitated by considering typical lined valve constructions in which the valve body and plug are made of a corrosion resisting material such as stainless steel, while the liner is fabricated from a plastic material having a substantially higher coefficient of thermal expansion than stainless steel, such as one of the polytetrafluoroethylene materials sold under the trade name Teflon. In this connection, reference is made to the copending applications of Robert C. Schenck, Serial No. 146,645, filed February 28, 1950, now Patent Number 2,713,987, and Serial No. 176,600, filed July 29, 1950, now Patent Number 2,729,420, and of Deas Sinkler, Serial No. 226,689, filed May 16, 1951, now Patent Number 2,728,550, all of which are assigned to the same assignee as this application and disclose lined valves of the above type. Lined valves constructed of the above specific combination of materials illustrate very well the difficulties outlined above, because while the Teflon materials have definite practical advantages for use in valve liners from the standpoint of their inert nature, resilience and antifrictional properties, they have coefficients of thermal expansion of the order of seven times greater than that of stainless steel, and also they are subject to cold flow in definite relation to the temperature and pressure effective thereon. These combined properties may therefore result in undesirable permanent deformation of the liner unless adequate preventative measures are taken.

Thus considering the simple case of a lined plug valve having a cylindrical plug operating in a cylindrical bore in the valve body, the necessary sealing pressure acting radially of the plug may be established by initial proportioning of the liner for compression between the plug and body without axially directed pressure thereon, or by exerting pressure on the liner axially of the plug. In either case, any substantial change in the temperature effective on the valve will cause a change in the pressure effective on the liner where the differences in the coefficients of thermal expansion of the liner and of the plug and body are as great as noted for the above specific combination of materials.

Under such conditions, if the liner is initially confined under pressure axially of the plug, the ends of the liner will ordinarily have no room for expansion. There is therefore no room for the liner to expand except into the ports of the plug and body. This is obviously undesirable both as tending to reduce the effective flow area through the valve and also as raising the possibility of shearing off of portions of the liner as the plug rotates. If on the other hand, the liner is not initially confined under pressure axially of the plug and can therefore expand at its ends under increased pressures due to a rise in temperature, then depending upon the initial proportions of the liner and the space available therefor in the valve body, it is still possible that permanent elongation of the liner may take place at high temperatures due to excessive axial expansion necessary to compensate for increased radial pressures, with the result that when the valve cools, the liner will shrink out of sealing relation with the body. This is particularly likely to occur if the liner is free to expand axially outwardly beyond the end of the bore in the body, since it will then tend to expand radially and thereby to form a shoulder capable of preventing the remainder of the liner from shrinking back again into the bore as the valve cools.

For valves in which the plug and the bore therefor in the valve body are tapered, the conditions are similar but more complex. If the liner is confined at both ends, then the only opportunity for expansion is into the ports as already discussed above. If the liner is confined at the large end of the plug, its principal expansion will take place toward its smaller end, and when the temperature drops, the liner will tend to hang up by shrinkage on the small end of the plug and thus shrink away from the sealing surface of the bore irrespective of whether its total expansion under pressure has been in excess of its elastic limit, its action under these conditions being similar to what happens as already described in connection with a cylindrical plug and bore if the liner is free to expand axially beyond the end of the bore and then to develop a shoulder on the exposed end thereof. If the liner is free to expand axially at both ends with changes in temperature, then when it subsequently shrinks, it will tend to hang up on the small end of the plug and thus shrink principally toward its small end, with the maintenance of the seal depending primarily on whether or not its elastic limit has been exceeded to an extent causing cold flow. Substantially the same conditions obtain if the liner is confined only at the small end of the plug.

In view of the above related facts, it appears that when it is necessary to use a liner material in a lined valve which has a different coefficient of thermal expansion from the materials of the valve body and plug, the configuration of all of the parts as well as the proportioning of the liner with respect to the space therefor between the plug and body are of major importance if effective sealing is to be maintained over a temperature range. More specifically, in accordance with the invention provision is made for controlled differential expansion of the liner and the other parts of the valve over the range of operating temperatures and pressures of the valve to the end that the pressures effective on the liner do not reach a value causing permanent deformation of the liner to take place.

The present invention accordingly has as one of its major objects the provision of a lined valve in which the valve body and plug and the liner are of such interrelated properties and proportions that expansion thereof and the pressures effective therein as the result of changes in temperature will be so retained within the elastic limit of the parts that effective sealing pressures will be maintained over the entire temperature range of use.

An additional object of the invention is to provide a lined valve in which the related sizes and degrees of taper of the plug and the bore therefor in the valve body are so proportioned with respect to the material of the liner and the relation of its coefficient of thermal expansion to the coefficients of the plug and body that the liner is free to expand or contract as required by changes in temperature without substantial change in the pressure effective thereon between the plug and body and thus without cold flow or other permanent deformation tending to reduce the desired maintained effective sealing pressure.

Another object is to provide a lined valve in which the liner is of a material having a substantially greater coefficient of thermal expansion than the materials of the plug and body, in which these parts are so proportioned as to establish clearance space adjacent at least one end of the liner into which the liner material can expand lengthwise with changes in temperature, and in which the relative proportions of these parts are correlated with their respective coefficients of thermal expansion and the operating range of temperatures effective on the valve to cause the liner to expand into this clearance space at a volumetric rate which is within the elastic limits of the liner material without undergoing permanent deformation.

It is also an object of the invention to provide a lined valve of the tapered type in which the mating surfaces of the plug and body are tapered at different angles at such relation with each other and the relative coefficients of thermal expansion thereof and of the liner material that thermal expansion of the liner will take place both axially and radially to such extent as to retain the pressure on the liner below a value causing permanent deformation thereof throughout the temperature range to which the valve is subjected in use.

Further objects and advantages of the invention will be apparent from the following description, the accompanying drawings and the appended claims.

In the drawings—

Figure 1:
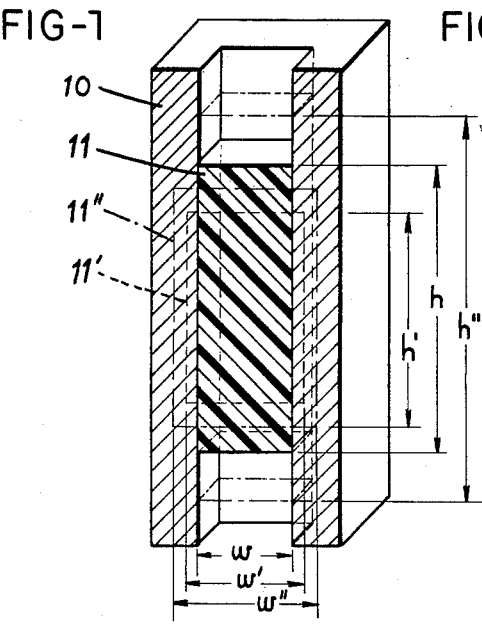
Fig. 1 is a somewhat diagrammatic sectional view illustrating the effects of thermal expansion on a metallic shell containing an insert of a plastic material suitable for use as a valve liner and having a substantially higher cofficient of thermal expansion than the shell.

Referring to the drawings, which illustrate preferred embodiments of the invention, Fig. 1 shows a metallic shell 10 of square cross section containing an insert 11 of a material having a substantially higher coefficient (C') of thermal expansion than the coefficient (C) of the shell 10. For the sake of illustration, let it be assumed that the insert 11 is of a material capable of resilient deformation or distortion to the extent of approximately 5 percent of its original dimensions at a given temperature (T') without permanent deformation, and that it has been compressed a total of two percent of its original cross-sectional dimensions in being press fitted into the shell 10.

In Fig. 1, the configuration of the insert 11 in unconfined condition at the temperature T' is represented in dark lines at 11', and it has a height $h'$ and a width $w'$. The corresponding dimensions of the insert as press fitted within the shell include a height $h$ and a width which is equal to the inside of width $w$ of the shell 10 at the temperature T'. In this example, the length or height of the shell is not material so long as it is substantially larger than the corresponding dimensions of the insert as shown, and it is also assumed that the mating surfaces of the insert and shell are smooth to permit relative movement thereof.

If now the shell and insert in Fig. 1 are heated over a temperature range (T) from the temperature T' to a second temperature T'', both parts will expand at different rates depending upon their respective coefficients of thermal expansion, and their total amounts of expansion will in turn depend upon their initial dimensions. Thus the dimension $w$ within the shell will increase to a value $w$CT and the cross-sectional area within the shell will correspondingly increase. At the same time, however, the insert 11 will try to expand to the width $w''$ and the configuration 11'' shown in dot and dash lines which it would assume if unconfined over the same temperature rise. However, since the insert is confined within the shell, it is instead compressed radially and thus is forced to expand lengthwise until it assumes the length or height $h''$. Its width and cross-sectional area will at the same time increase to the extent permitted by the expansion of the shell, but since this increase is small in comparison with the increase in height, it is not shown in Fig. 1.

In this example as illustrated in Fig. 1, the major expansion of the insert 11 is confined to the direction of its length or height, and there is correspondingly substantial radial compression of the insert. This radial compression is equal to $w''-w$, and it may be compared with the original compression $w'-w$ required for press fitting of the insert in the shell of the temperature T'. It follows in this example from the initially specified properties of the insert that if $w''-w$ is greater than .05 $w''$, then permanent longitudinal deformation of the insert will take place as the result of heating the assembly over the full temperature range T from T' to T''. It is then apparent that for a minimum required value of $w'-w$ at T' and a maximum permissible value of $w''-w$ at T'', it is readily possible to calculate the limits of $w'$ and $h'$ to maintain sealing pressure within the shell over the full range T. Similarly, with a given $w'$ and $h'$, it is readily possible to calculate the maximum temperature range T. If the insert material is of such character, like the Teflon materials, that its limit of resilient deformability varies with temperature, such characteristic should also be included in the calculations.

Figure 2:
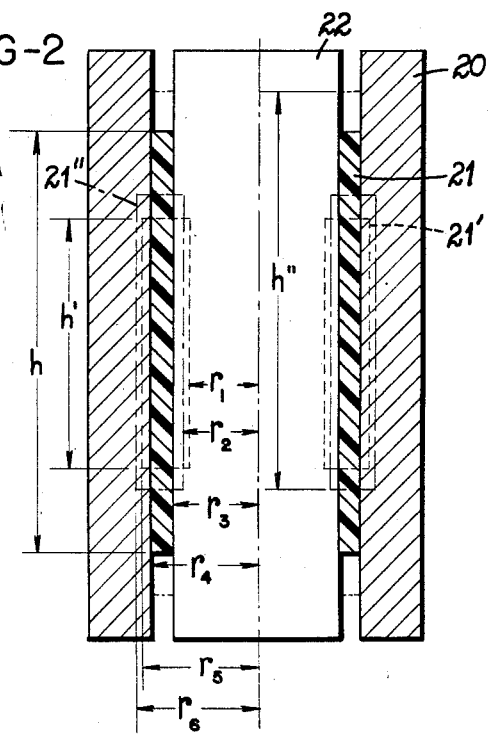
Fig. 2 is a diagrammatic sectional view illustrating similar conditions for a sleeve of liner material mounted between the metallic shell and a metallic mandrel.

Fig. 2 illustrates the corresponding case in which the metallic shell 20 contains a cylindrical tubular insert 21 which corresponds to the insert 11 and in turn encloses a metallic cylindrical mandrel 22. As in the case of Fig. 1, the sleeve 21 is assumed to have a substantially higher coefficient (C') of thermal expansion than the coefficient C of the shell 20 and also of the coefficient C'' of the mandrel. Both the shell and mandrel are shown as longer than the sleeve so that the latter can expand in both directions axially without projecting outwardly from the space between the mandrel and shell, as is emphasized by the showing of the height $h''$ as less than the length of the shell 10.

In Fig. 2, the configuration which the sleeve 21 would assume if unconfined at a temperature T' is indicated in dash lines at 21', and it has a height $h'$, an inner radius $r_1$ and an outer radius $r_5$. The sleeve 21 is press fitted between the shell 20 and mandrel 22 so that it assumes an inner radius $r_3$ and an outer radius $r_4$ which are the radius of the mandrel and the inner radius of the shell respectively at the temperature T', and the sleeve is therefore correspondingly elongated to a height $h$. The dot and dash line showing 21'' indicates the configuration which the sleeve would assume if heated in unconfined condition over the temperature range (T) from the temperature T' to a given temperature T'', and in this condition its inner radius $r_2$ would be equal to $r_1(1+TC')$ and its outer radius $r_6$ would equal $r_5(1+TC')$.

The broken outline in Fig. 2 having the height $h''$ indicates the configuration of the sleeve 21 after the entire assembly is heated to the temperature T''. As in the case of Fig. 1, the accompanying expansion of the sleeve and mandrel have been disregarded for purposes of more convenient illustration, but the height $h''$ is shown as sufficiently less than the length of the shell 20 to assure that the sleeve 21 will not expand axially beyond the ends of the shell or the mandrel 22. Complete accuracy for purposes of calculation would require taking into account the fact that the inner radius of the sleeve in its heated condition would be equal to $r_3(1+TC'')$ and the outer radius of the sleeve would be equal to $r_4(1+TC)$.

It will now be apparent from the above discussion in connection with Fig. 2 that the proper proportions of the parts in Fig. 2 may be calculated in accordance with their respective coefficients of thermal expansion and the required pressure conditions therebetween. Thus if a minimum deformation of sleeve 21 at T' is required to establish the desired pressure, and a maximum resilient deformation is permissible at T'' without permanent deformation of the sleeve, the limits of the initial height $h'$ and of the initial wall thickness $r_5-r_1$ for the sleeve are readily calculated. Similarly for a given initial height or length and wall thickness of the sleeve, the maximum temperature range T is readily calculated. It will also now be apparent that if there are practical conditions dictating both the temperature range and also the initial height and wall thickness of the sleeve, they may be met by suitable selection of the several parts with relation to their respective coefficients of thermal expansion in accordance with the above outlined principles.

Figure 3:
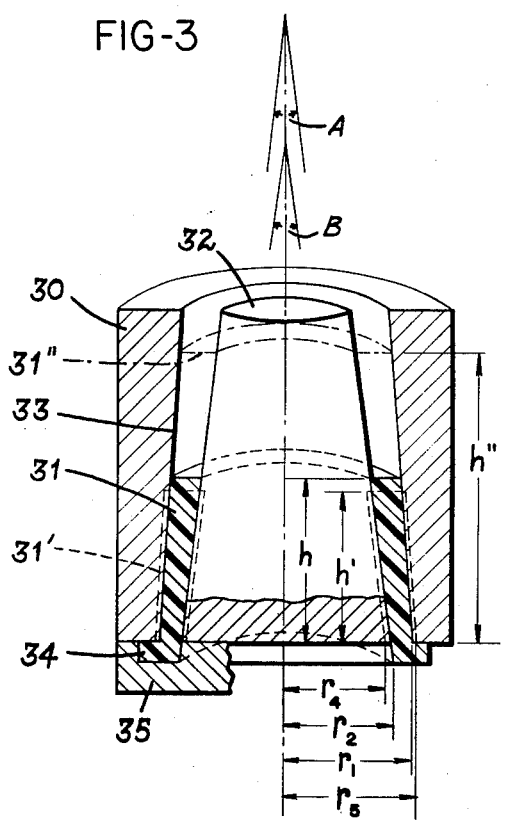
Fig. 3 is a diagrammatic sectional view similar to Fig. 2 and illustrates the combination of a sleeve of liner material mounted between a conical mandrel and the conically tapered bore in a metallic shell, with the sleeve being anchored at its larger end.

Fig. 3 illustrates diagrammatically one case typifying conditions applicable as discussed above to a plug valve in which the body or shell 30 has a tapered bore receiving the liner or sleeve 31 which encloses the tapered plug or mandrel 32, the bore in shell 30 being identified as 33. In Fig. 3, the total included angle of the bore 33 is identified as A, and the total included angle of the mandrel 32 is identified as B. These angles are shown as different and with angle B greater than angle A so that the space between the mandrel and shell is of increasing cross section in the direction of the small end of the mandrel. In addition, the sleeve 31 is shown as confined at its larger end, by means of a flange 34 thereon which is clamped against the shell by a member 35 corresponding to the cap for the body of a plug valve.

In Fig. 3, the bore 33 has a radius $r_1$ at its large end at a temperature T', and the corresponding radius of the mandrel is identified as $r_2$. The sleeve is accordingly press fitted to these dimensions at its large end, and it assumes a height $h$ and an area at its large end equal to $\pi r_1^2 - \pi r_2^2$. The dash line showing 31' represents the configuration of the sleeve in unconfined condition at the temperature T', with its height shown as $h'$ and its outer and inner radii identified as $r_3$ and $r_4$ respectively. The unconfined volume V' of the sleeve differs from its volume V as confined between the mandrel and shell only to the extent to which the material composing the sleeve is compressible volumetrically at the pressure required for assembly of the parts as at T' and this difference is negligible in the case of the Teflon material noted above. The total reduction of the outer diameter ($2r_3$) of the sleeve to its assembled outer diameter ($2r_1$) may be identified as $S_1$, and similarly the total increase of the inner diameter ($2r_4$) of the unconfined sleeve to its assembled inner diameter ($2r_2$) may be identified as $S_2$.

When the assembly of Fig. 3 is heated over the temperature range T from the temperature T' to a temperature T'', the mandrel and shell will expand in accordance with their respective coefficients of thermal expansion, and the sleeve 31 will similarly seek to expand as described in connection with Fig. 2 to the volume it would occupy at T'' and the increased pressure effective thereon by reason of its attempted greater radial expansion than the radial dimensions of the cavity therefrom between the mandrel and shell. However, since the sleeve is confined in this cavity, it is forced to expand lengthwise as indicated at 31'' to a length or height $h''$, with this expansion limited to the direction of the small end of the mandrel by reason of the anchoring of the large end of the sleeve as described, and also with this length or height $h''$ sufficiently less than the axial dimensions of the body 30 and the plug 32 to prevent the sleeve 31 from expanding axially beyond the end of either the plug or the body. The extent to which the resulting outer diameter of the sleeve at its large end differs from its corresponding outer diameter if unconfined at temperature T'' may be identified as $S_3$, and the corresponding extent of difference between its inner diameters as confined and unconfined may be identified as $S_4$.

If in this example the mandrel 32 and bore 33 were tapered at the same angle, the space therebetween would decrease in cross sectional area toward the small end of the mandrel, but with these surfaces tapered to diverge as shown, the cross sectional area can remain the same or can increase depending upon the difference between angles A and B. The important controlling factor in accordance with the invention is that this space available for expansion of the sleeve 31 should be so correlated with the dimensions and coefficients of thermal expansion of these parts and also with the temperature range that the enforced expansion of the sleeve will be retained within its elastic limits, so that upon subsequent cooling and shrinkage, the sleeve will contract with an effectively volumetric wedging action which will retain the pressure conditions within the desired sealing range. Ideally, these results are obtained when the space available to receive the expanding sleeve increases at effectively the same rate as the sleeve itself, and also this space should be of greater volume than the maximum increase in volume of the sleeve to assure that the sleeve is always confined radially to prevent possible formation of an expanded shoulder thereon beyond the end of the plug or body as already pointed out above.

It will now be apparent that the desired sealing conditions can be maintained by suitable selection and calculation of the materials and proportions of the parts in accordance with the principles of the invention as already described. Thus for a given $S_1-S_2$, $S_3-S_4$, T', T'' and $r_2$, the maximum wall thickness ($r_3-r_4$) may be readily calculated. Similarly for a given $S_1-S_2$, $S_3-S_4$, T', T'', $r_2$, $r_3-r_4$, and H, it is possible to calculate the proper ratio of angle A to angle B, and it is similarly possible to calculate the maximum temperature range T''—T' from a given $S_1-S_2$, $S_3-S_4$, $r_2$, $r_3-r_4$, H, angle A and angle B. It will also be apparent that for some conditions, it may be desirable that angle A or angle B be equal to zero, i. e., that the mandrel or bore be cylindrical while the other is tapered. In either of the latter cases, the sleeve should be anchored at its smaller end in order to force it when cooling to shrink into the space of decreasing cross-sectional area.

It should be noted that in the construction of Fig. 3, the expansion of the sleeve 31 is in three dimensions, but its shrinkage is primarily confined to two directions, namely axially toward the large end of the mandrel and radially inwardly. This in turn creates a tendency for the sleeve to hang up on the small end of the mandrel and thus not to return axially to its original shape and position. It is this factor which has a large effect on the tendency in a lined valve to develop leakage as the result of the liner shrinking inwardly out of contact with the bore in the valve body, a tendency which is successfully overcome by the construction of the parts in accordance with the invention as outlined above. Conditions are comparable but not the same if the sleeve is not anchored at its large end.

Figure 4:
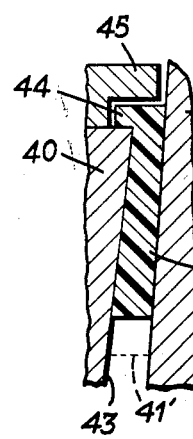
Fig. 4 is a fragmentary view similar to Fig. 3 and showing the sleeve anchored at its smaller end.

Thus Fig. 4 illustrates a modified arrangement of the construction of Fig. 3, including the shell 40, sleeve 41 and tapered mandrel 42. The tapered bore in the shell is identified as 43, and a flange 44 on the small end of the sleeve is anchored by retaining member 45. Fig. 4 shows the parts in their relative positions at the selected low temperature T', and it is understood that the sleeve is deformed into sealing relation with the shell and mandrel from an initially shorter and thicker section as described in connection with Figs. 1–3.

When the assembly of Fig. 4 is heated to a second temperature T'', such differential expansion of the sleeve 41 as takes place with respect to the shell and mandrel will be primarily in the direction of the large end of the mandrel, as indicated at 41', since the small end of the sleeve is anchored. According to the invention, therefore, the space between the mandrel and bore 43 should increase in cross sectional area toward the large end of the mandrel in order to provide the desired increased space to receive the expanding material of the sleeve. In this assembly, this result may be achieved under some conditions if the mandrel and bore are parallel, i. e., if their angles of taper are equal, but it is usually found desirable to have these surfaces in diverging relation toward the large end of the plug, i. e., in the opposite relation from Fig. 3, especially if the difference between the coefficients of thermal expansion of the sleeve and those of the shell and mandrel is as substantial as in the case of the Teflon material mentioned above. Having regard for these facts and the above principles of the invention, it is apparent that the same values can be calculated for the construction of Fig. 4 as already described in connection with Fig. 3.

Figure 5:
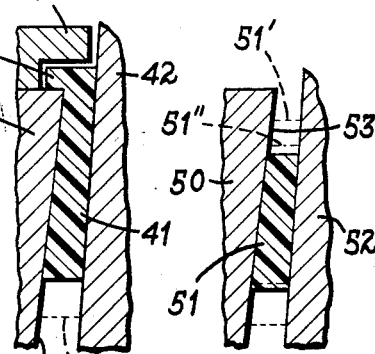
Fig. 5 is a fragmentary view similar to Fig. 4 showing the sleeve unanchored at both ends.

Fig. 5 shows similarly to Fig. 4 a further case in which the tapered sleeve 51 is located between a shell 40 and a tapered mandrel 52 and is not anchored at either end, the proportions of these parts being exaggerated for purposes of illustration. The showing of the sleeve 51 in full lines represents the relative arrangement of the parts at the selected low temperature T' following deformation of the sleeve from an initially greater wall thickness, and the dash line showing 51' represents the expanded condition of the sleeve at a higher temperature T''. It will be noted that this expansion is in both directions axially of the assembly, which is possible with both ends of the sleeve initially not obstructed or anchored.

When the assembly of Fig. 5 shrinks on cooling, there is to some extent the same effect as described in connection with Fig. 3 for the sleeve to hang up on the smaller end of the mandrel. This is not objectionable if the parts are properly proportioned, but it may cause an overall shifting in position of the sleeve, which is indicated by the dot and dash line showing 52''. The proportions and other values for the parts can be calceulated in the same manner as described above in connection with Fig. 3, and in general it will be found desirable for the mandrel 52 and the corresponding surface 53 of the bore in the shell 50 to diverge toward the larger end of the mandrel. This arrangement will minimize shifting of the position of the sleeve, since the rapidly increasing pressure on the small end of the sleeve as the temperature rises will have an anchoring effect causing the major expansion to take place toward the large end of the mandrel. This is desirable since subsequent shrinkage will be in the direction of the small end of the mandrel with resulting rapid wedging into proper sealing position.

The above description is directly applicable to plug valves of the lined type discussed at the outset of this specification, and especially to the designing of lined plug valves for specific applications with respect to their capacity and the temperature range effective thereon in use. Thus in each of Figs. 2–5, the shell and mandrel correspond to the valve body and plug of a lined valve in which the liner corresponds to the sleeve of Figs. 2–5, and the pressure to be maintained on the liner depends upon the temperature and pressure in the line on which the valve is to be used. It will also now be apparent that there are several different conditions affecting the construction and proportioning of such valves.

Thus considering first a plug valve of the general characteristics illustrated by Fig. 2 in which the plug and bore are both cylindrical and hence have their mating surfaces parallel, there is a definite relationship between the thickness of the liner section and the temperature range within which adequate sealing is assured. In other words, a liner of a given section can tolerate a limited amount of axial expansion without corresponding radial expansion, and the permissible temperature range decreases with increase in the wall section of the liner, since the greater the wall section, the greater the percentage of deformation as the temperature rises.

It follows that in the above cases illustrated by Fig. 2, a liner of given length and wall section will operate without permanent deformation over a definite temperature range, but for a given specific range, there is not necessarily a liner of practically workable dimensions. For a greater temperature range, the liner thickness or length must decrease if its coefficient of thermal expansion is greater than those of the plug and body but must increase if its coefficient is less. It will also be apparent that a liner capable of meeting a varied set of conditions may be obtained by suitable choice of the liner material from the standpoint of the relation of its coefficient to those of the plug and body as discussed above.

These several limiting factors with respect to lined valves having a cylindrical plug and bore are in large measure avoided by tapered valves constructed in accordance with the above principles of the invention, which make it possible to design a valve construction capable of meeting established operating conditions by retaining the expansion of the liner within its elastic limits and thus avoiding cold flow or other permanent deformation of the liner. In addition to the interrelationships of the several parts of such a valve as described above, certain further general rules for the design of such valves should be noted where the plug and body are of the same material and the liner is of a specific coefficient of thermal expansion substantially higher than the coefficient of the body and plug:

(1) If the space available for the liner is of uniform cross-sectional area, the conditions are effectively the same as for a cylindrical plug and bore, and as the dimensions of the parts are changed to cause progressive increase or decrease in the cross-sectional area available to the liner for expansion, the temperature range of use for the valve correspondingly increases or decreases.

(2) The liner should be anchored, or caused to anchor, at its end of smaller cross-sectional area in order to direct its expansion towards the space of maximum cross-sectional area.

(3) If either end of a liner is anchored, there is an optimum wall section for a given temperature range, and this in turn determines the optimum taper for both the plug and bore.

(4) If the liner is anchored at the larger end of the plug, the plug and bore cannot be tapered at the same angle but should diverge towards the small end of the plug at a sufficient angle to cause the cross-sectional area of the liner to increase toward the large end of the plug.

(5) In cases other than in (4), for a given wall section and length for the liner, there is one optimum angle which can be the same for both the plug and bore.

(6) If in (5), it is desired to use a different angle for either the plug or bore, then the angle for the other should also be changed.

(7) If a given end of the liner is to be anchored and there is a preferred angle for the bore or plug, the other such angle should be chosen to cause the cross-sectional area therebetween to increase in the direction away from the anchored end of the liner in proper proportion with the thickness of the liner and the differences between the respective coefficients of thermal expansion.

(8) In general, it is desirable to utilize the smallest tapers and minimum liner section compatible with the service conditions for each particular valve.

Figure 6:
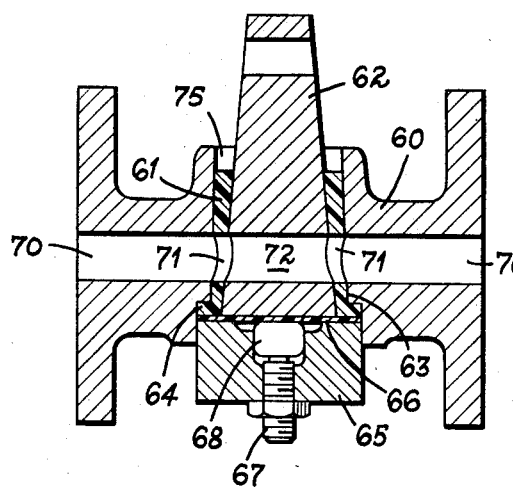
Fig. 6 is a view in axial section showing a lined plug valve constructed in accordance with the invention and including a liner anchored at its larger end.

Figs. 6–10 illustrate different constructions of tapered lined plug valves embodying the principles of the present invention as outlined above. In Fig. 6, the valve body 60 receives a tubular liner 61 and conically tapered plug 62, and the bore 63 is tapered at a smaller included angle than the plug, these two angles being shown as 4° and 8° respectively. The liner 61 has a flange 64 at its larger end which is clamped against the valve body by a cap 65 of the conventional type, and a diaphragm 66 is positioned between cap 65 and the plug and liner. The cap 65 carries the usual adjusting screw 67 and plunger 68 for applying pressure to the large end of the plug.

The valve body 60 includes the usual ports 70 adapted to register with the ports 71 in the liner and flow passage 72 in the plug. Since the liner is anchored both axially and angularly in the body by the cap 65, its smaller end does not require angular retention and is therefore free to expand axially into the space 75 of increasing cross-sectional diameter created by the differential taper of the plug with respect to the bore 63. If, therefore, these parts are properly proportioned in accordance with the principles of the invention as outlined above, the liner will maintain proper sealing pressure over the desired temperature range.

Figure 7:
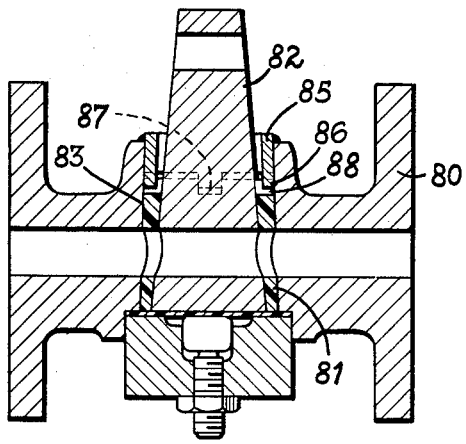
Fig. 7 is a view similar to Fig. 6 showing the same general form of lined plug valve with the liner unanchored at both ends.

Fig. 7 shows a valve construction closely similar to that of Fig. 6, and including a valve body 80, tubular liner 81 and tapered plug 82 in the bore 83. The liner 81, however, does not have a flange thereon and is not axially anchored at either end. Instead, a locking ring 85 is welded in the smaller end of the bore 83 and includes lug portions 86 interfitting with complementary slots 87 in the adjacent smaller end of the liner to hold the liner against angular movement. The liner is accordingly initially proportioned to a lesser axial length than the clearance between the plug and bore to leave space 88 at one or both ends of the liner for receiving the material thereof in response to thermal expansion.

Figure 8:
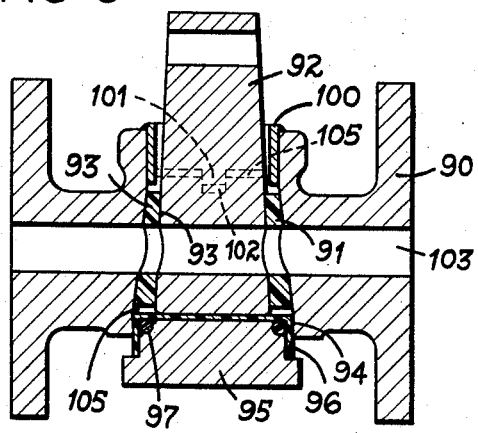
Fig. 8 is a view similar to Fig. 6 showing another construction of lined plug valve wherein the plug is tapered on a smaller angle than the bore in the body.

Fig. 8 shows another valve construction generally similar to that of Fig. 7 and including a valve body 90, liner 91 and tapered plug 92 in a tapered bore 93. The larger end of the bore 93 includes a short cylindrical portion 94 which receives the pilot portion of the cap 95, the cap being provided with a cup diaphragm 96 and O-ring 97 for increased sealing action. Fig. 8 shows the plug 92 as tapered to a smaller totally included angle than the bore 93, these angles being shown as 4° and 10°90′ respectively. Angular locking of the liner is provided by a locking ring 100 welded in the smaller end of the bore 93 similar to locking ring 85 in Fig. 7 and including lugs 101 interfitting in slots 102 in the smaller end of the liner. This overall construction is especially applicable to valves of small sizes, such for example as valves wherein the flow passage 103 is one-half inch in diameter, and the parts are initially proportioned in accordance with the intended temperature range of use to provide the desired clearance 105 at one or both ends of the liner to receive its material upon thermal expansion.

Figure 9:
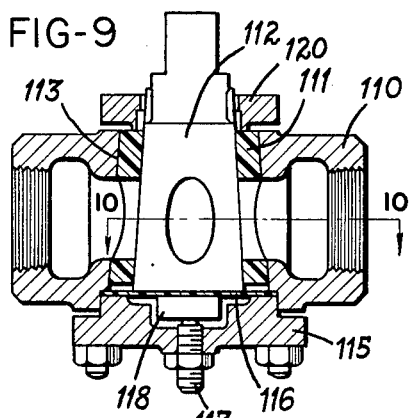
Fig. 9 is a view similar to Fig. 6 showing still another construction of lined plug valve wherein the liner is unanchored at both ends but is contoured for angular locking in the bore in the valve body, the view being in section on the line 9—9 of Fig. 10.
Figure 10:
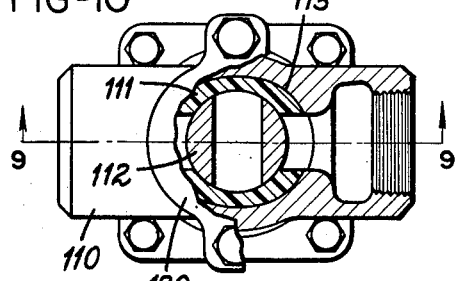
Fig. 10 is a view partly in plan and partly in section on the line 10—10 of Fig. 9.

Figs. 9 and 10 illustrate the application of the invention to a lined valve of the type shown in the above noted Sinkler application and including a valve body 110, liner 111 and conical plug 112. Angular interfitting between the liner and the bore 113 is established by providing the liner and bore with complementary contoured mating surfaces which are non-circular in radial section. Thus as shown in Fig. 10, these surfaces have in section an outline composed of portions of two intersecting circles each somewhat greater than 180° in angular extent and arranged with their respective centers spaced from each other and lying on opposite sides of the central axis of the bore.

The bottom cap 115, diaphragm 116, adjusting screw 117, plunger 118 and top cap 120 in Figs. 9 and 10 may be of conventional construction. Since the liner does not require anchoring at either end, it should be initially proportioned in accordance with the invention so that it can expand at both ends as may be required over the range of temperatures to which the valve is expected to be subjected in use. The plug 112 is accordingly shown as tapered to the same angular extent as the bore in the body in order to provide adequately increasing space at the larger end of the plug in accordance with the principles of the invention as discussed above.

Figure 11:
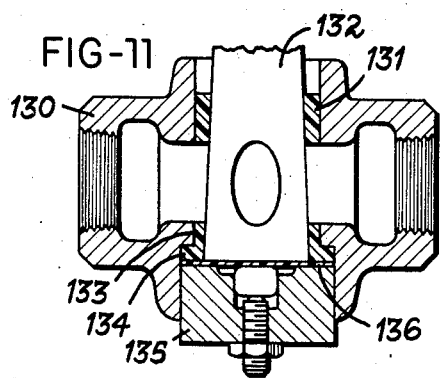
Fig. 11 is a view similar to Fig. 6 showing a construction of lined plug valve in accordance with the invention wherein the plug is tapered and the bore in the body is cylindrical.

Fig. 11 illustrates the application of the invention to a lined valve in which a tapered plug is received within a cylindrical bore in the valve body. In Fig. 11, the valve body 130 receives a liner sleeve 131 and tapered plug 132, and the plug is tapered in the direction of its upper end while the bore 133 in the body is cylindrical. The liner includes an anchoring flange 134 at the large end of the plug which cooperates with the cap 135 and diaphragm 136 in the same manner as described in connection with Fig. 6. The angular relation between the plug and the bore in Fig. 11 may be calculated as described above to provide adequate clearance at the smaller end of the plug to receive the liner material upon thermal expansion.

While the methods and forms of apparatus herein described constitute preferred embodiments of the invention, it is to be understood that the invention is not limited to these precise methods and forms of apparatus, and that changes may be made therein without departing from the scope of the invention, which is defined in the appended claims.

What is claimed is:

1. A lined plug valve capable of maintaining sealing pressures over a predetermined wide temperature range, comprising a valve body having a bore therein provided with ports in the surface thereof, a rotatable plug in said bore having a flow passage therethrough for alignment with said ports and being of lesser cross section than said bore to leave an annular clearance therebetween, a liner received in said clearance and having ports therethrough matching said ports in said bore, said liner being formed of a resiliently deformable material subject to permanent deformation upon distortion beyond the elastic limit thereof and having a coefficient of thermal expansion substantially higher than the materials composing said valve body and plug, one of the mating surfaces of said plug and bore being conically tapered, means for applying pressure on said plug to establish sealing pressure engagement of said liner with said mating surfaces of said plug and said bore at the minimum temperature within said range, said liner being of lesser axial length than said plug and said bore at said minimum temperature to provide space axially beyond said liner in said clearance for receiving the material of said liner upon expansion thereof with respect to said plug and body in response to a rise in temperature, the axial dimension of said clearance being at least equal to the maximum axial dimension of said liner at the maximum temperature within said range to prevent possible radial expansion of said liner beyond the end of said plug or bore, and said body and plug and said liner being proportioned in coordinated relation with the coefficients of thermal expansion of the materials thereof and said temperature range to provide volume in said space at least equal to the maximum increase in the volume of said expanded liner material at said maximum temperature while maintaining the deformation of said liner within the elastic limits thereof and also maintaining said liner in sealing engagement with said bore and said plug throughout said temperature range.

2. A lined plug valve capable of maintaining sealing pressures over a predetermined wide temperature range, comprising a valve body having a bore herein provided with ports in the surface thereof, a rotatable plug in said bore having a flow passage therethrough for alignment with said ports and being of lesser cross section than said bore to leave an annular clearance therebetween, a liner received in said clearance and having ports therethrough matching said ports in said bore, said liner being formed of a resiliently deformable material subject to permanent deformation upon distortion beyond the elastic limit thereof and having a coefficient of thermal expansion substantially higher than the materials composing said valve body and plug, at least one of the mating surfaces of said plug and bore being of conical shape and the other said surface extending at an angle to said one surface such that the cross-sectional area of said liner increases lengthwise thereof, means for applying pressure on said plug to establish sealing pressure engagement of said liner with said mating surfaces of said plug and bore at the minimum temperature within said range, said liner being of lesser axial length than said plug and said bore at said minimum temperature to provide space in said clearance axially beyond the end of said liner of greater cross-sectional area for receiving the material of said liner upon expansion thereof with respect to said plug and body in response to a rise in temperature, the axial dimension of said clearance being at least equal to the maximum axial dimension of said liner at the maximum temperature within said range to prevent possible radial expansion of said liner beyond the end of said plug or bore, and said body and plug and said liner being proportioned in coordinated relation with the coefficients of thermal expansion of the materials thereof and said temperature range to provide volume in said space at least equal to the maximum increase in the volume of said expanded liner material at said maximum temperature while maintaining the deformation of said liner within the elastic limits thereof and also maintaining said liner in sealing engagement with said bore and said plug throughout said temperature range.

3. A lined plug valve capable of maintaining sealing pressures over a predetermined wide temperature range, comprising a valve body having a bore therein provided with ports in the surface thereof, a rotatable plug in said bore having a flow passage therethrough for alignment with said ports and being of lesser cross section than said bore to leave an annular clearance therebetween, one of the mating surfaces of said plug and bore being conically tapered, the other of the mating surfaces being in diverging angular relation therewith to impart a varying cross-sectional area to said annular clearance, a liner received in said clearance and having ports therethrough matching said ports in said bore, said liner being formed of a resiliently deformable plastic material composed of a halogen substitution product of polyethylene subject to permanent deformation upon distortion beyond the elastic limit thereof and having a coefficient of thermal expansion substantially higher than the materials composing said valve body and plug, said liner being proportioned in predetermined relation with said plug and said bore to establish sealing pressure engagement of said liner with said mating surfaces of said plug and bore at the minimum temperature within said range, said liner being of lesser axial length than said plug and said bore at said minimum temperature to provide space axially beyond said liner in said clearance and of said increasing cross-sectional area for receiving the material of said liner upon expansion thereof with respect to said plug and body in response to a rise in temperature from said minimum temperature, the axial dimension of said clearance being at least equal to the maximum axial dimension of said liner at the maximum temperature within said range to prevent possible radial expansion of said liner beyond the end of said plug or bore, and said body and plug and said liner being further proportioned in coordinated relation with the coefficients of thermal expansion of the materials thereof and said temperature range to provide volume in said space at least equal to the maximum increase in the volume of said expanded liner material at said maximum temperature while maintaining the deformation of said liner within the elastic limits thereof and also maintaining said liner in sealing engagement with said bore and said plug throughout said temperature range.

4. A lined plug valve capable of maintaining sealing pressures over a predetermined wide temperature range, comprising a valve body having a bore therein provided with ports in the surface thereof, a rotatable plug in said bore having a flow passage therethrough for alignment with said ports and being of lesser cross section than said bore to leave an annular clearance therebetween, one of the mating surfaces of said plug and bore being conically tapered, the other of said mating surfaces being in diverging angular relation therewith to impart a varying cross-sectional area to said annular clearance, a liner received in said clearance and having ports therethrough matching said ports in said bore, said liner being formed of a resiliently deformable material subject to permanent deformation upon distortion beyond the elastic limit thereof and having a coefficient of thermal expansion substantially higher than the materials composing said valve body and plug, said liner being proportioned in predetermined relation with said plug and said bore to establish sealing pressure engagement of said liner with said mating sufraces of said plug and bore at the minimum temperature within said range, said liner being of lesser axial length than said plug and said bore at said minimum temperature to provide space axially beyond said liner in said clearance and of said increasing cross sectional area for receiving the material of said liner upon expansion thereof with respect to said plug and body in response to a rise in temperature, the axial dimension of said clearance being at least equal to the maximum axial dimension of said liner at the maximum temperature within said range to prevent possible radial expansion of said liner beyond the end of said plug or bore, and said body and plug and said liner being further proportioned in co-ordinated relation with the coefficients of thermal expansion of the materials thereof and said temperature range to provide volume in said space at least equal to the maximum increase in the volume of said expanded liner material at said maximum temperature while maintaining the deformation of said liner within the elastic limits thereof and also maintaining said liner in sealing engagement with said bore and said plug throughout said temperature range.

5. A lined plug valve capable of maintaining sealing pressures over a predetermined wide temperature range, comprising a valve body having a bore therein provided with ports in the surface thereof, a rotatable plug in said bore having a flow passage therethrough for alignment with said ports and being of lesser cross section than said bore to leave an annular clearance therebetween, a liner received in said clearance and having ports therethrough matching said ports in said bore, said liner being formed of a resiliently deformable material subject to permanent deformation upon distortion beyond the elastic limit thereof and having a coefficient of thermal expansion substantially higher than the materials composing said valve body and plug, at least one of the mating surfaces of said plug and bore being of conical shape and the other said surface extending at an angle to said one surface such that the cross-sectional area of said liner is smaller at one end than at the other end thereof, means for anchoring said smaller end of said liner against axial movement in said body, means for applying pressure on said plug to establish sealing pressure engagement of said liner with said mating surfaces of said plug and bore at the minimum temperature within said range, said liner being of lesser axial length than said plug and said bore at said minimum temperature to provide space axially beyond the larger end of said liner in said clearance for receiving the material of said liner upon expansion thereof with respect to said plug and body in response to a rise in temperature, the axial dimension of said clearance being at least equal to the maximum axial dimension of said liner at the maximum temperature within said range to prevent possible radial expansion of said liner beyond the end of said plug or bore, and said body and plug and said liner being proportioned in coordinated relation with the coefficients of thermal expansion of the materials thereof and said temperature range to provide volume in said space at least equal to the maximum increase in the volume of said expanded liner material at said maximum temperature while maintaining the deformation of said liner within the elastic limits thereof and also maintaining said liner in sealing engagement with said bore and said plug throughout said temperature range.

References Cited in the file of this patent

UNITED STATES PATENTS

| | | |
|---|---|---|
| 193,111 | Cleveland | July 17, 1877 |
| 262,935 | Dibble | Aug. 22, 1882 |
| 597,728 | Martin | Jan. 25, 1898 |
| 1,532,251 | Lorraine | Apr. 7, 1925 |
| 1,730,799 | Bowes | Oct. 8, 1929 |
| 2,506,069 | Dalton | May 2, 1950 |
| 2,567,527 | Parks | Sept. 11, 1951 |
| 2,639,496 | Hartzell | May 26, 1953 |